(12) United States Patent
Zhang et al.

(10) Patent No.: US 12,056,418 B2
(45) Date of Patent: Aug. 6, 2024

(54) CONTENT-BASED VOICE OUTPUT METHOD AND DISPLAY APPARATUS

(71) Applicant: QINGDAO HISENSE MEDIA NETWORKS LTD., Shandong (CN)

(72) Inventors: Mingshan Zhang, Shandong (CN); Jinbo Li, Shandong (CN); Tongqing Zhao, Shandong (CN)

(73) Assignee: QINGDAO HISENSE MEDIA NETWORKS LTD., Qingdao (CN)

( * ) Notice: Subject to any disclaimer, the term of this patent is extended or adjusted under 35 U.S.C. 154(b) by 232 days.

(21) Appl. No.: 17/684,562

(22) Filed: Mar. 2, 2022

(65) Prior Publication Data

US 2022/0188069 A1     Jun. 16, 2022

Related U.S. Application Data

(63) Continuation of application No. PCT/CN2020/091876, filed on May 22, 2020.

(30) Foreign Application Priority Data

Jan. 17, 2020   (CN) .......................... 202010054165.2
Jan. 17, 2020   (CN) .......................... 202010054194.9

(51) Int. Cl.
   *G06F 3/16*      (2006.01)
   *H04N 21/47*     (2011.01)
   *H04N 21/472*    (2011.01)

(52) U.S. Cl.
   CPC ....... *G06F 3/167* (2013.01); *H04N 21/47217* (2013.01)

(58) Field of Classification Search
   CPC ......... H04N 21/47217; H04N 21/6587; H04N 21/4542; H04N 21/4394; H04N 21/44008; H04N 21/812; H04N 21/435; H04N 21/4852; H04N 21/8106; H04N 21/4221; H04N 21/478; G06F 3/167
   USPC .......................................................... 725/38
   See application file for complete search history.

(56) References Cited

U.S. PATENT DOCUMENTS 5,809,447 A      9/1998  Kato et al.
9,338,493 B2 *   5/2016  Van Os ............. H04N 21/42203
10,175,933 B1 *  1/2019  Wagner ................ H04N 21/436
                         (Continued)

FOREIGN PATENT DOCUMENTS

CN      101246020 A     8/2008
CN      101419546 A     4/2009
                (Continued)

OTHER PUBLICATIONS

International Search Report, mailed Oct. 28, 2020, for PCT/CN2020/091876 filed May 22, 2020.

*Primary Examiner* — Ngoc K Vu
(74) *Attorney, Agent, or Firm* — ANOVA LAW GROUP, PLLC

(57) ABSTRACT

Disclosed is a content-based voice output method, including: displaying a user interface comprising at least one item and a selector for indicating that an item is selected; in response to a first instruction, causing the selector to move from a first item to a second item, and playing voice content corresponding to the second item; and in response to a second instruction, playing a first explanation voice related to the voice content.

18 Claims, 11 Drawing Sheets

(56) References Cited

U.S. PATENT DOCUMENTS

| | | | |
|---|---|---|---|
| 2014/0053223 A1* | 2/2014 | Vorobyov | G10L 13/00 725/110 |
| 2015/0106854 A1 | 4/2015 | Fabian-Isaacs et al. | |
| 2015/0248887 A1* | 9/2015 | Wlodkowski | G06F 3/04892 704/246 |
| 2016/0307962 A1 | 10/2016 | Yi et al. | |
| 2016/0370982 A1* | 12/2016 | Penha | H04N 21/47211 |
| 2017/0289619 A1* | 10/2017 | Xu | H04N 21/25866 |
| 2019/0208285 A1* | 7/2019 | Chapman | H04N 21/47217 |
| 2019/0339927 A1 | 11/2019 | Gosu et al. | |
| 2020/0097500 A1* | 3/2020 | Breaux | H04N 21/4755 |
| 2021/0014591 A1* | 1/2021 | Kim | H04R 1/028 |

FOREIGN PATENT DOCUMENTS

| | | |
|---|---|---|
| CN | 101453580 A | 6/2009 |
| CN | 201274149 Y | 7/2009 |
| CN | 102196213 A | 9/2011 |
| CN | 102566748 A | 7/2012 |
| CN | 102687525 A | 9/2012 |
| CN | 104093083 A | 10/2014 |
| CN | 104394137 A | 3/2015 |
| CN | 104636959 A | 5/2015 |
| CN | 105049637 A | 11/2015 |
| CN | 105282119 A | 1/2016 |
| CN | 106648306 A | 5/2017 |
| CN | 107484015 A | 12/2017 |
| CN | 107577722 A | 1/2018 |
| CN | 108777808 A | 11/2018 |
| CN | 109308897 A | 2/2019 |
| CN | 109389967 A | 2/2019 |
| CN | 109618206 A | 4/2019 |
| CN | 109756616 A | 5/2019 |
| CN | 110264760 A | 9/2019 |
| CN | 111026354 A | 4/2020 |
| JP | H09258946 A | 3/1997 |
| JP | 2007087104 A | 4/2007 |
| WO | 2017165052 A1 | 9/2017 |

* cited by examiner

CONTENT-BASED VOICE OUTPUT METHOD AND DISPLAY APPARATUS

CROSS-REFERENCE OF RELATED APPLICATIONS

The application is a continuation application of International Application No. PCT/CN2020/091876 filed May 22, 2020, which claims the priorities from Chinese Patent Application No. 202010054194.9 filed on Jan. 17, 2020 and entitled "content-based voice output method and display apparatus" and Chinese Patent Application No. 202010054165.2 filed on Jan. 17, 2020 and entitled "content-based voice output method and display apparatus", which are hereby incorporated by reference in their entirety.

TECHNICAL FIELD

The disclosure relates to the field of display technology, and in particular, to a content-based voice output method and a display apparatus.

BACKGROUND

The voice output function in a display apparatus refers to outputting audio for a piece of text through algorithms. The voice output function allows blind people or visual impaired people to control a TV set more easily and conveniently, to enjoy multimedia services better. The voice output function makes the display apparatus accessible to visual impaired people. However, there is still some room for improvement.

The current voice output function focuses more on meeting the standards of some countries and regions, while the use experience for the user is not good in practical applications.

SUMMARY

The disclosure provides a content-based voice output method and a display apparatus, so as to improve user's experience.

In some embodiments, a display apparatus is provided, including: a display configured to present a user interface including at least one item, wherein the user interface includes a selector for indicating that an item is selected, and the selector on the user interface is configured to move to select a different item via a user input; a user input interface is further configured to receive an instruction input from a user; a controller in communication with the display and the user input interface and configured to: in response to a first instruction, move the selector from a first item to a second item and output a voice content corresponding to the second item; output a first explanation voice related to the voice content in response to a second instruction.

In some embodiments, a content-based output method is provided, including: in response to a first instruction, moving the selector from a first item to a second item and outputting a voice content corresponding to the second item; outputting a first explanation voice related to the voice content in response to a second instruction.

In some embodiments, a display apparatus is provided, including: a display configured to present a user interface for playing audio and video content; wherein the user interface includes: a time progress bar for indicating play progress of the audio and video content, and a selector is configured to move via a user input; a user input interface configured to receive an instruction input from a user; a controller in communication with the display and user input interface and configured to: in response to a first instruction, locate the selector on the time progress bar and play first voice content corresponding to a first progress point indicated by the selector in real time; in response to a period of time since the first voice content is output reaching a preset time interval, output second voice content corresponding to a second progress point indicated by the selector.

In some embodiments, a content-based voice output method is provided, including: in response to a first instruction, locating a selector on the time progress bar and outputting first voice content corresponding to the first progress point indicated by the selector in real time; in response to a period of time since the first voice content is output reaching a preset time interval, outputting second voice content corresponding to a second progress point indicated by the selector.

In some embodiments, a display apparatus is provided, including: a display configured to present a user interface for playing audio and video content; wherein the user interface includes: a time progress bar for indicating play progress of the audio and video content, and a selector configured to move via a user input; a user input interface is configured to receive an instructions input from a user; a controller in communication with the display and the user input interface and configured to: in response to a first instruction, locate the selector on the time progress bar and play first voice content corresponding to the first progress point indicated by the selector in real time; in response to a second instruction, move the selector on the time progress bar from the first progress point to a second progress point; in response to a third instruction, move the selector on the time progress bar from the second progress point to a third progress point, and output third voice content corresponding to the third progress point indicated by the selector in real time; wherein an input time interval between the second instruction and the third instruction is less than a preset value.

In some embodiments, a content-based voice output method is provided, including: in response to a first instruction, locating a selector on the time progress bar and output first voice content corresponding to the first progress point indicated by the selector in real time; in response to a second instruction, moving the selector on the time progress bar from the first progress point to a second progress point; in response to a third instruction, moving the selector on the time progress bar from the second progress point to a third progress point, and outputting a third voice content corresponding to the third progress point indicated by the selector in real time; wherein an input time interval between the second instruction and the third instruction is less than a preset value.

DETAILED DESCRIPTION

In order to make the purposes, embodiments and advantages of the disclosure clearer, the embodiments of the disclosure will be described clearly and completely below in combination with the accompanying drawings in embodiments of the disclosure. Obviously the described embodiments are only some but not all the embodiments. Based upon embodiments of the disclosure, all of other embodiments obtained by those ordinary skilled in the art without creative work shall fall within the protection scope of the disclosure.

The term "user interface" in the disclosure is an interface for interaction and information exchange between applications or operating systems, and users. It realizes the conversion between an internal form of information in the display apparatus and a form of information acceptable to users. The commonly-used form of the user interface is Graphic User Interface (GUI), which refers to an interface presented in a graphic manner and associated with computer operations. It may comprise an interface element such as icon, window, control or the like displayed in the display screen of a display apparatus, wherein the controls may include icon, button, menu, tab, text box, dialog box, status bar, navigation bar, Widget, and other visual interface elements.

Figure 1A:
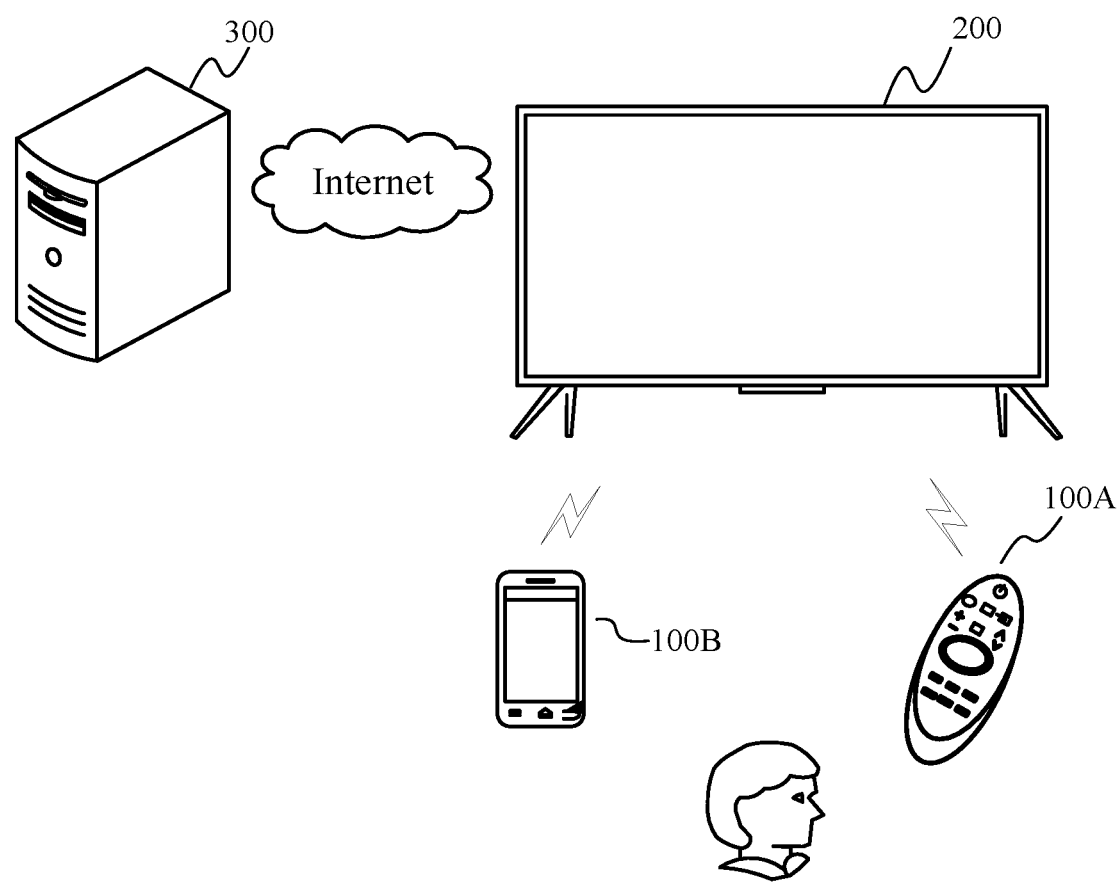
FIG. 1A shows a schematic diagram of an operation scenario between a display apparatus and a control device.

FIG. 1A shows a schematic diagram of an operation scenario between a display apparatus and a control device. As shown in FIG. 1A, the communications between the control device 100 and the display apparatus 200 may be in a wired or wireless manner.

Here, the control device 100 is configured to control the display apparatus 200, receive the operation command input from the user, and convert the operation command into an instruction that can be recognized and responded by the display apparatus 200, which serves an intermediary media between the user and the display apparatus 200. For example, the user operates the channel+/−keys on the control device 100, and the display apparatus 200 responds to the channel+/−operations.

The control device 100 may be a remote controller 100A, which operates via the infrared protocol communication or Bluetooth protocol communication and other short-range communication schemes, etc., and controls the display apparatus 200 wirelessly or by other wired methods. The user may input user commands through the keys on the remote controller, voice inputs, control panel inputs, etc. to control the display apparatus 200. For example, the user may input corresponding commands through the volume+/−keys, channel keys, up/down/left/right directional keys, voice input keys, menu key, power key, etc. on the remote controller to control the functions of the display apparatus 200.

The control device 100 may also be a smart device, such as a mobile terminal 100B, a tablet computer, a computer, a notebook computer, etc. For example, an application running on the smart device is used to control the display apparatus 200. This application may be configured to provide the user with various controls through an intuitive User Interface (UI) on the screen associated with the smart device.

In some embodiments, the mobile terminal 100B and the display apparatus 200 may install software applications, and implement the connection and communication through the network communication protocols, achieving the purpose of one-to-one control operation and data communication. For example, the mobile terminal 100B and the display apparatus 200 may establish an instruction protocol, and the functions of the physical keys arranged in the remote control 100A are realized by operating various function keys or virtual buttons on the user interface provided on the mobile terminal 100B. The audio and video content displayed on the mobile terminal 100B may also be transmitted to the display apparatus 200 to realize the synchronous display function.

The display apparatus 200 may provide a broadcast receiving function and a computer supported network TV function. The display apparatus may be implemented as digital TV, Internet TV, Internet Protocol TV (IPTV), etc.

The display apparatus 200 may be a liquid crystal display, an organic light emitting display, or a projection device. The specific type, size and resolution of the display apparatus are not limited.

The display apparatus 200 communicates with a server 300 through various communication methods. Here, the display apparatus 200 may be allowed to perform the communication and connection through a Local Area Network (LAN), a Wireless Local Area Network (WLAN), and other networks. The server 300 may provide various contents and interactions to the display apparatus 200. Exemplarily, the display apparatus 200 may send and receive information, for example: receive the Electronic Program Guide (EPG) data, receive the software updates, or access a remotely stored digital media library. The server 300 may be in one cluster or multiple clusters, and may be of one or more types. The server 300 provides the video on demand, advertising service and other network service content.

Figure 1B:
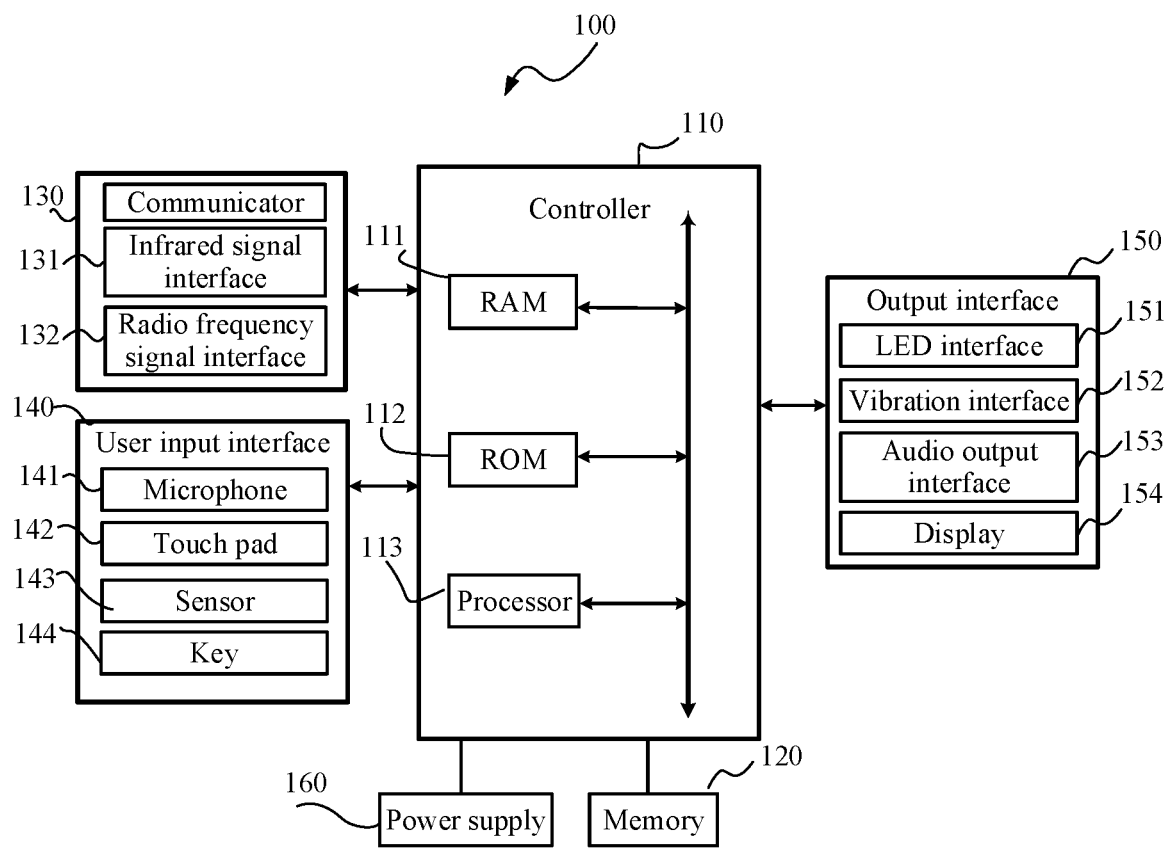
FIG. 1B shows a configuration block diagram of the control device 100 in FIG. 1A.

FIG. 1B shows a block diagram of the configuration of the control device 100. As shown in FIG. 1B, the control device 100 includes a controller 110, a memory 120, a communicator 130, a user input interface 140, an output interface 150, and a power supply 160.

The controller 110 includes a Random Access Memory (RAM) 111, a Read Only Memory (ROM) 112, a processor 113, a communication interface and a communication bus. The controller 110 is configured to control the running and operations of the control device 100, and the communication cooperation among internal components as well as the external and internal data processing functions.

In some embodiments, when an interaction event like a user pressing a key on the remote controller 100A or touching a touch panel on the remote controller 100A is detected, the controller 110 may generate a signal corresponding to the detected event and send the signal to the display apparatus 200.

The memory 120 is used to store various operating programs, data and applications that drive and control the control device 100 under the control of the controller 110. The memory 120 may store various kinds of control signal commands input from the user.

The communicator 130 realizes the communications of control signals and data signals with the display apparatus 200 under control of the controller 110. For example, the control device 100 sends a control signal (e.g., a touch signal or a button signal) to the display apparatus 200 via the communicator 130, and the control device 100 may receive a signal sent from the display apparatus 200 via the communicator 130. The communicator 130 may include an infrared signal interface 131 and a radio frequency signal interface 132. For example, in the case of infrared signal interface, the command input from the user is converted into an infrared control signal according to the infrared control protocol and then sent to the display apparatus 200 via the infrared sending module. As another example, in the case of radio frequency signal interface, the command input from the user is converted into a digital signal, modulated according to the radio frequency control signal modulation protocol, and then the modulated signal is sent to the display apparatus 200 via the radio frequency sending module.

The user input interface 140 may include at least one of a microphone 141, a touch pad 142, a sensor 143, a key 144, etc., so that a user may input the command for controlling the display apparatus 200 to the control device 100 through voice, touch, gesture, pressing, etc.

The output interface 150 outputs a user command received from the user input interface 140 to the display apparatus 200, or outputs the image or voice signal received from the display apparatus 200. Here, the output interface 150 may include an LED interface 151, a vibration interface 152 that generates vibration, a sound output interface 153 that outputs sound, and a display 154 that outputs image, etc. For example, the remote control 100A may receive output signal such as audio, video or data from the output interface 150, and display the output signal in the form of image on the display 154, in the form of audio on the sound output interface 153, or in the form of vibration on the vibration interface 152.

The power supply 160 is used to provide operating power support for all the elements of the control device 100 under control of the controller 110. The power supply may include battery and related control circuit.

Figure 1C:
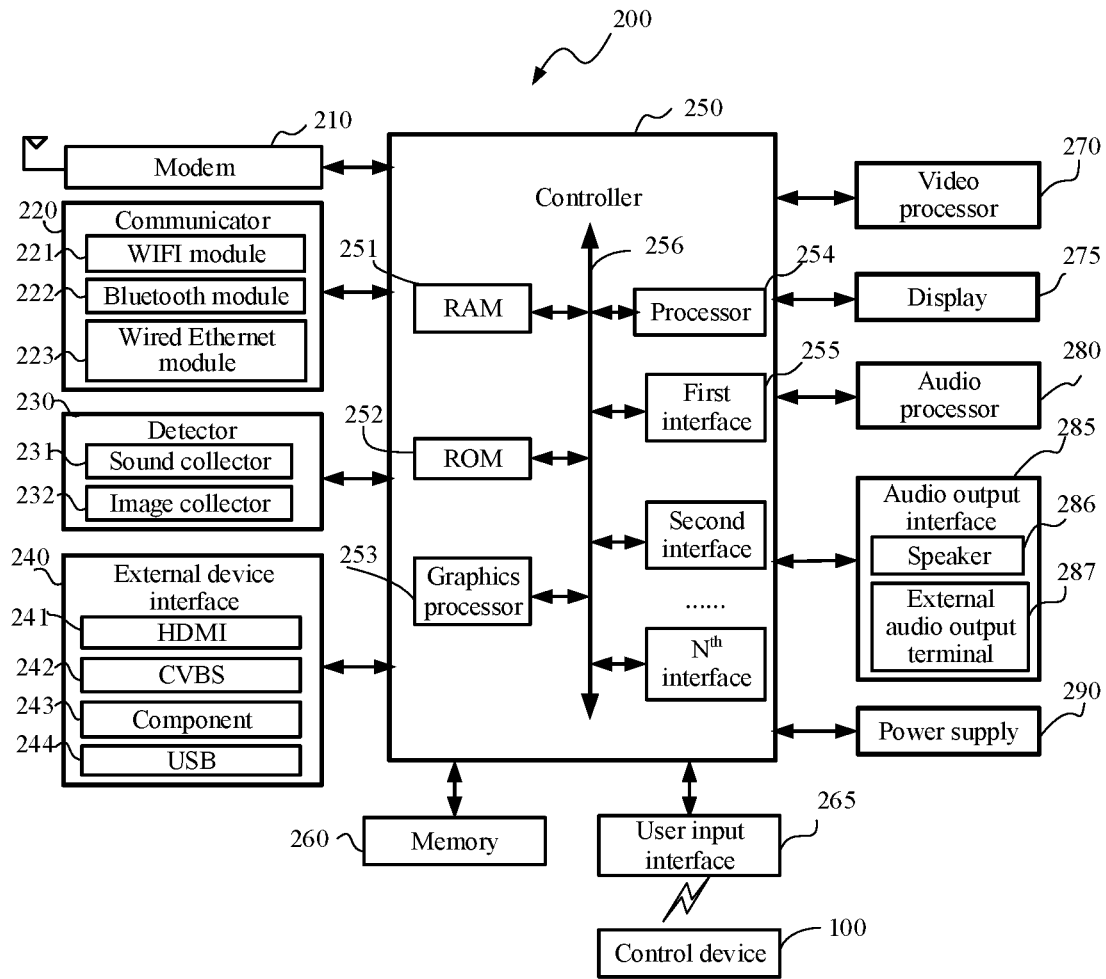
FIG. 1C shows a configuration block diagram of the display apparatus 200 in FIG. 1A.

FIG. 1C shows a block diagram of a hardware configuration of the display apparatus 200. As shown in FIG. 1C, the display apparatus 200 may include a modem 210, a communicator 220, a detector 230, an external device interface 240, a controller 250, a memory 260, a user interface 265, a video processor 270, a display 275, an audio processor 280, an audio output interface 285, and a power supply 290.

The modem 210 receives the broadcast television signals in a wired or wireless manner, and may perform the amplification, frequency mixing, resonance and other modulation/demodulation processing, to demodulate the television audio/video signals carried in the frequency of the television channel selected by the user from multiple wireless or wired broadcast television signals, as well as additional information (e.g., EPG data).

The modem 210 may respond to the television signal frequency selected by the user and the television signal carried by the frequency according to the user's selection under control of the controller 250.

According to different television signal broadcasting formats, the modem 210 may receive signals in many forms, such as: terrestrial digital television, cable broadcasting, satellite broadcasting, or Internet broadcasting or the like; according to different modulation types, the digital modulation mode or analog modulation mode may be used; and according to different types of television signals, the analog signals and digital signals may be used.

In other exemplary embodiments, the modem 210 may also be in an external device, such as an external set-top box. In this way, the set-top box outputs television audio/video signals after modulation and demodulation, which are input to the display apparatus 200 through the input/output interface 240.

The communicator 220 is a component in communication with an external device or an external server according to various types of communication protocols. For example, the display apparatus 200 may send the content data to an external device connected via the communicator 220, or browse and download the content data from an external device connected via the communicator 220. The communicator 220 may include a WIFI module 221, a Bluetooth communication protocol module 222, a wired Ethernet communication protocol module 223, and other network communication protocol modules or near-field communication protocol modules, so that the communicator 220 can receive control signals of the control device 100 under the control of the controller 250 and implement the control signals as WIFI signals, Bluetooth signals, radio frequency signals, etc.

The detector 230 is a component configured for the display apparatus 200 to collect the external environment signal or the signal interacted with the outside. The detector 230 may include a sound collector 231, such as a microphone, which may be configured to receive the user's voice, e.g., a voice signal of the user's command to control the display apparatus 200; or may collect the environment sound for identifying the environment scene type, so that the display apparatus 200 can adapt to the environment noise accordingly.

In some other exemplary embodiments, the detector 230 may further include an image collector 232, such as camera, webcam, etc., which may be configured to collect the external environment scene to adaptively change the display parameters of the display apparatus 200, and collect the user's attributes or user's interaction gestures to realize the function of interaction between the display apparatus and the user.

In some other exemplary embodiments, the detector 230 may further include a light receiver configured to collect the ambient light intensity to allow the display apparatus 200 to adjust display parameters, etc.

In other exemplary embodiments, the detector 230 may further include a temperature sensor. For example, by sensing the ambient temperature, the display apparatus 200 may adjust the display color temperature of the image accordingly. In some embodiments, when the environment has a high temperature, the color temperature of the image presented on the display apparatus 200 may be adjusted to cold color tone; when the environment has a low temperature, the image presented on the display apparatus 200 may be adjusted to warm color tone.

The external device interface 240 is a component that provides for the controller 250 to control the data transmission between the display apparatus 200 and external devices. The external device interface 240 may be connected to external devices such as set-top box, game device, laptop, etc. in a wired/wireless manner, and may receive the data such as video signals (e.g., moving images), audio signals (e.g., music), additional information (e.g., EPG), etc. of the external devices.

Here, the external device interface 240 may include: any one or more of a High-Definition Multimedia Interface (HDMI) 241, a Composite Video Blanking Synchronization (CVBS) interface 242, an analog or digital component interface 243, a Universal Serial Bus (USB) interface 244, a Component interface (not shown in the figure), a Red-Green-Blue (RGB) interface (not shown in the figure), etc.

The controller 250 controls the operations of the display apparatus 200 and responds to the user's operations by running various software control programs (such as operating system and various applications) stored on the memory 260. For example, the controller may be implemented as a System-on-a-Chip (SOC).

As shown in FIG. 1C, the controller 250 includes a Random Access Memory (RAM) 251, a Read Only Memory (ROM) 252, a graphics processor 253, a CPU processor 254, a communication interface 255, and a communication bus 256, wherein the RAM 251, the ROM 252, the graphics processor 253, the CPU processor 254 and the communication interface 255 are connected through the communication bus 256.

The ROM 252 is used to store various system startup instructions. For example, when receiving a power-on signal, the power supply of the display apparatus 200 starts, and the CPU processor 254 runs the system startup instructions in the ROM 252 and copies the operating system stored in the memory 260 into the RAM 251 to start to run and initiate the operating system. When the initiation of the operating system is completed, the CPU processor 254 then copies various applications in the memory 260 into the RAM 251, and then starts to run and initiate various applications.

The graphics processor 253 is used to generate various graphics objects, such as icons, operation menus, display graphics of user input instructions, etc. The graphics processor 253 may include: an arithmetic unit configured to perform the operations by receiving various interactive instructions input from users and then display various objects according to the display attributes; and a renderer configured to generate the result of rendering various objects obtained based on the arithmetic unit and display it on the display 275.

The CPU processor 254 is used to execute the operating system and application instructions stored in the memory 260, and process various applications, data and content according to the instructions input from the user, so as to finally display and play various audio/video contents.

In some exemplary embodiments, the CPU processor 254 may include multiple processors. The multiple processors may include a main processor and one or more sub-processors. The main processor is used to perform some initialization operations of the display apparatus 200 the pre-power-up mode, and/or the operations of the display picture in the normal mode. One or more sub-processors are used to perform an operation in the standby mode or other states of the display apparatus.

The communication interface 255 may include a first interface to an $n^{th}$ interface. These interfaces may be network interfaces connected to external devices via a network.

The controller 250 may control the overall operation of the display apparatus 200. For example, in response to receiving a user command for selecting a GUI object presented on the display 275, the controller 250 may perform the operations related to the object selected by the user input command. For example, the controller may be implemented as an SOC (System on Chip) or an MCU (Micro Control Unit).

Here, the object may be any one of objects available for selection, such as a hyperlink or an icon. The operations related to selected objects for example include: operations for displaying a hyperlinked page, document or image, or operations for launching applications corresponding to icons. User commands for selecting a GUI object can be commands input from various input devices (for example, a mouse, a keyboard, a touch pad, etc.) connected to the display apparatus 200 or voice commands corresponding to voices from the user.

The memory 260 is used to store various types of data, software programs or applications for driving and controlling the operations of the display apparatus 200. The memory 260 may include a volatile and/or non-volatile memory. The term "memory" includes the memory 260, the RAM 251 and ROM 252 of the controller 250, or a memory card in the display apparatus 200.

In some embodiments, the memory 260 is further configured to store an application for driving the controller 250 in the display apparatus 200; store various applications built in the display apparatus 200 and downloaded by the user from external devices; and store data for configuring various GUIs provided by the display 275, various GUI-related objects, and visual effect images of a selector for selecting GUI objects.

In some embodiments, the memory 260 is further configured to drive programs and related data of the modem 210, communicator 220, detector 230, external device interface 240, video processor 270, display 275 and audio processor 280, etc., for example, the external data (such as audio and video data) received from the external device interface or the user data (such as key information, voice information, touch information, etc.) received from the user interface.

In some embodiments, the memory 260 specifically stores softwares and/or programs for representing the Operating System (OS), where these softwares and/or programs may include, for example, kernel, middleware, Application Programming Interface (API), and/or applications. In some embodiments, the kernel may control or manage the system resources or the functions implemented by other programs (such as the middleware, API or applications); and meanwhile, the kernel may provide interfaces to allow the middleware, API or applications to access the controller, to control or manage the system resources.

Figure 1D:
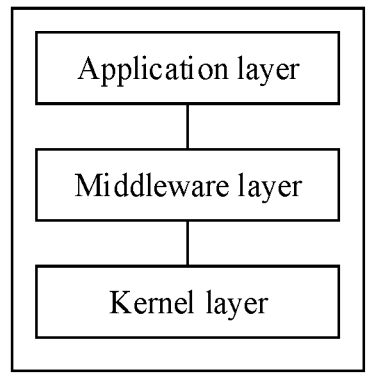
FIG. 1D shows a configuration block diagram of the architecture of the operating system in the memory of the display apparatus 200.

FIG. 1D shows a block diagram of the architecture configuration of the operating system in the memory of the display apparatus 200. The operating system architecture includes an application layer, a middleware layer and a kernel layer from top to bottom.

Regarding the application layer, the applications built in the system and the non-system-level applications belong to the application layer. They are responsible for direct interaction with users. The application layer may include a plurality of applications, such as a setting application, an E-pos application, a media center application, etc. These applications may be implemented as Web applications, which are executed based on the WebKit engine, and in particular may be developed and executed based on HTML5, Cascading Style Sheets (CSS) and JavaScript.

The middleware layer may provide some standard interfaces to support the operations of various environments and systems. For example, the middleware layer may be implemented as Multimedia and Hypermedia Information Coding Expert Group (MHEG) for data broadcast-related middleware, or may be implemented as DLNA middleware for external device communication-related middleware, or may be implemented as a middleware for providing the browser environment in which each application in the display apparatus runs, etc.

The kernel layer provides core system services, for example, file management, memory management, process management, network management, system security authority management, and other services. The kernel layer may be implemented as a kernel based on various operating systems, for example, a kernel based on a Linux operating system.

The kernel layer also provides the communication between system software and hardware, and provides device drive services for various hardware, for example: provides a display drive program for the display, provides a camera drive program for the camera, provides a button drive program for the remote control, provides a WiFi drive program for the WIFI module, provides an audio drive program for the audio output interface, provides a power management drive for the Power Management (PM) module, etc.

The user interface 265 receives various user interactions. Specifically, it is used to send the user's input signal to the controller 250 or transmit the output signal from the controller 250 to the user. In some embodiments, the remote control 100A may send the input signals such as power signal, channel selection signal, volume adjustment signal, etc. input from the user to the user interface 265, and then the user interface 265 forwards them to the controller 250; or the remote control 100A may receive the output signals such as audio, video or data processed by the controller 250 and output from the user interface 265, and display the output signals received or output the output signals received in the form of audio or vibration.

In some embodiments, the user may input a user command on the Graphical User Interface (GUI) presented on the display 275, and then the user interface 265 receives the command input from the user through the GUI. Specifically, the user interface 265 may receive the user command for controlling the position of a selector in the GUI to select different objects or items.

Alternatively, the user may input a user command by inputting particular speech or gesture, and then the user interface 265 recognizes the speech or gesture through the sensor to receive the user input command.

The video processor 270 is used to receive the video signal and perform the video data processing such as decompression, decoding, scaling, noise reduction, frame rate conversion, resolution conversion, and image synthesis according to the standard codec protocol of the input signal, to obtain the video signal that can be displayed or played directly on the display 275.

The video processor 270 includes a de-multiplexing module, a video decoding module, an image synthesis module, a frame rate conversion module, a display formatting module, etc.

Here, the de-multiplexing module is used to de-multiplex the input audio and video data stream, e.g., the input MPEG-2 stream, and then the de-multiplexing module de-multiplexes it into a video signal and an audio signal, etc.

The video decoding module is used to process the demultiplexed video signal, including decoding and scaling, etc.

The image synthesis module, such as image synthesizer, is used to superimpose and mix the GUI signal generated by a graphics generator according to the user input or by itself with the scaled video image, to generate an image signal for display.

The frame rate conversion module is used to convert the frame rate of an input video, for example, convert the frame rate of the input video of 60 Hz into the frame rate of 120 Hz or 240 Hz, where the usual format is implemented by frame interpolation.

The display formatting module is used to change the signal output from the frame rate conversion module into a signal conforming to such as the display format of the display, e.g., perform the format conversion on the signal output from the frame rate conversion module to output the RGB data signal.

The display 275 is used to receive the image signals input from the video processor 270, and display the video content, images and the menu control interface. The displayed video content may be the video content from the broadcast signal received by the modem 210, or may be the video content input from the communicator 220 or external device interface 240. The display 275 also presents the user control interface (UI) generated in the display apparatus 200 and used to control the display apparatus 200.

Also, the display 275 may include a panel for presenting images and a drive component that drives the image display. Alternatively, if the display 275 is a projection display, it may further include a projection device and a projection screen.

The audio processor 280 is used to receive an external audio signal, and perform the audio data processing such as decompression, decoding, noise reduction, digital-to-analog conversion and amplification according to the standard codec protocol of the input signal, to obtain an audio signal that can be played in the speaker 286.

In some embodiments, the audio processor 280 may support various audio formats. For example, MPEG-2, MPEG-4, Advanced Audio Coding (AAC), High Efficiency AAC (HE-AAC) and other formats.

The audio output interface 285 is used to receive the audio signal output from the audio processor 280 under the control of the controller 250, and the audio output interface 285 may include a speaker 286, or an external audio output terminal 287 output to a sound device of an external device, such as headphone output terminal.

In other exemplary embodiments, the video processor 270 may include one or more chips. The audio processor 280 may also include one or more chips.

In other exemplary embodiments, the video processor 270 and the audio processor 280 may be separate chips, or may be integrated into one or more chips together with the controller 250.

The power supply 290 is used to provide the power supply for the display apparatus 200 through the power input from an external power supply under the control of the controller 250. The power supply 290 may be a built-in power supply circuit installed inside the display apparatus 200, or may be a power supply installed outside the display apparatus 200.

Figure 2:
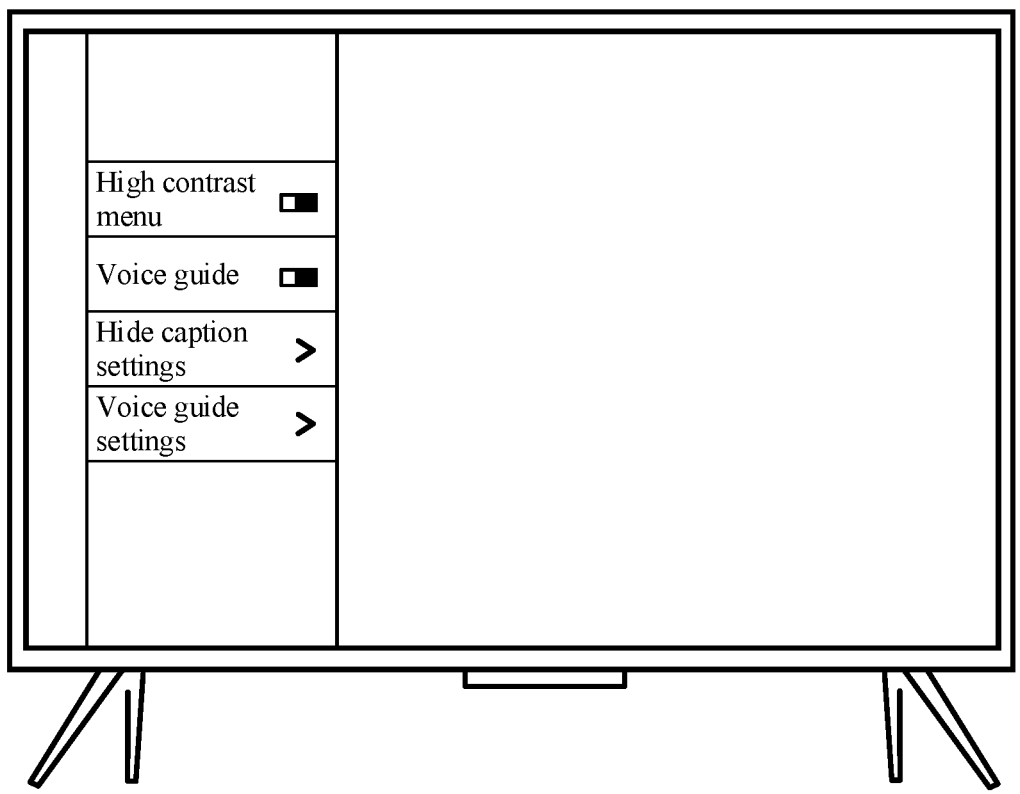
FIG. 2 shows a schematic interface for activating voice guide on the display apparatus 200.

FIG. 2 shows a schematic interface for activating voice guide presented on the display apparatus 200.

As shown in FIG. 2, the display apparatus may provide an interface for setting to select to activate or deactivate the function based on the user input on the display. Visual impaired people can activate the function when using the display apparatus, so as to activate the voice output function.

FIG. 3 shows schematic diagrams of a GUI 400 presented on the display apparatus 200 by operating the control device 100.

Figure 3A:
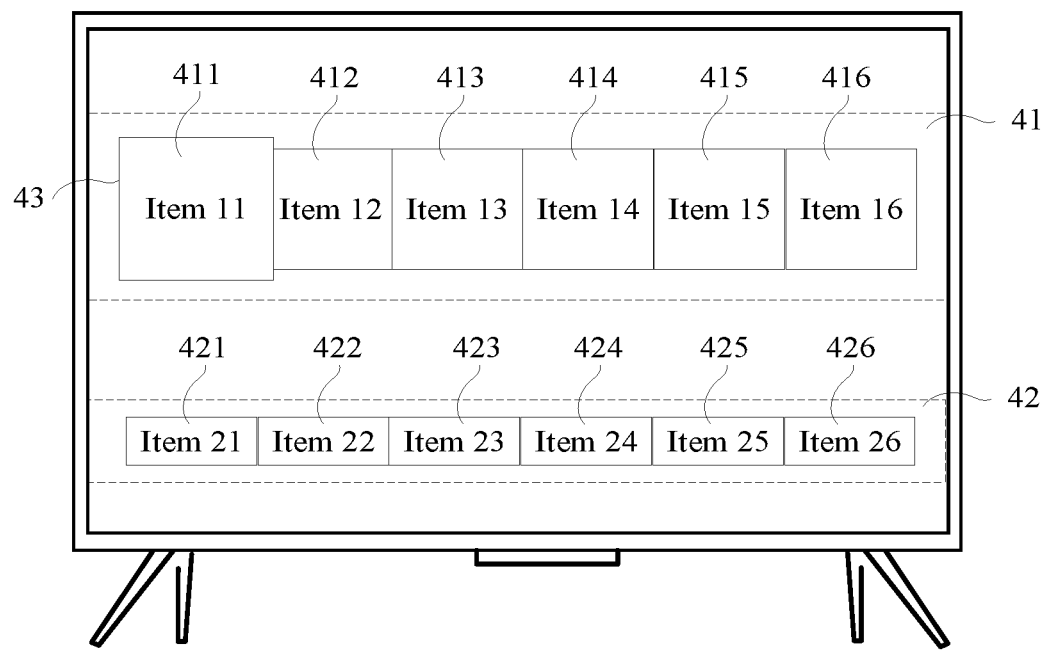
FIGS. 3A-3B show schematic diagrams of a GUI 400 on the display apparatus 200 by operating the control device 100.

In some embodiments, as shown in FIG. 3A, the display apparatus may provide a GUI 400 on the display, the GUI 400 includes a plurality of presentation areas for providing different image content, and each presentation area includes one or more different items therein. For example, the items 411 to 416 are shown in a first presentation area 41, and the items 421 to 426 are shown in a second presentation area 42. And the GUI further includes a selector 43 for indicating that an item is selected, and the position of the selector in the GUI or the position of each item in the GUI can be moved by the input of the user through operating the control device to change the selection of different items. For example, the selector 43 indicates that the item 411 in first presentation area 41 is selected.

It should be noted that an item refers to a visual object displayed in each presentation area of the GUI in the display apparatus 200 to represent the corresponding content such as icon, thumbnail, video clip, link, etc., and these items may provide users with various traditional program content received by data broadcasting as well as various applications and service content from content manufacturers, etc.

The items are usually presented in a variety of formats. For example, an item may include textual content and/or an image for displaying thumbnails associated with the text content. As another example, an item may be the text and/or icon of an application.

It should also be noted that the display form of the selector may be a focus object. The items may be selected or controlled by controlling the movement of the focus object displayed in the display apparatus 200 according to the user's input through the control device 100. For example, the user may select and control items by controlling the movement of the focus object among items through the direction keys on the control device 100. The identification form of the focus object is not limited. For example, the position of the focus object may be realized or identified by setting the background color of the item, or the position of the focus object may be identified by changing the border, size, transparency, outline and/or font of the text or image of the focus item.

Figure 3B:
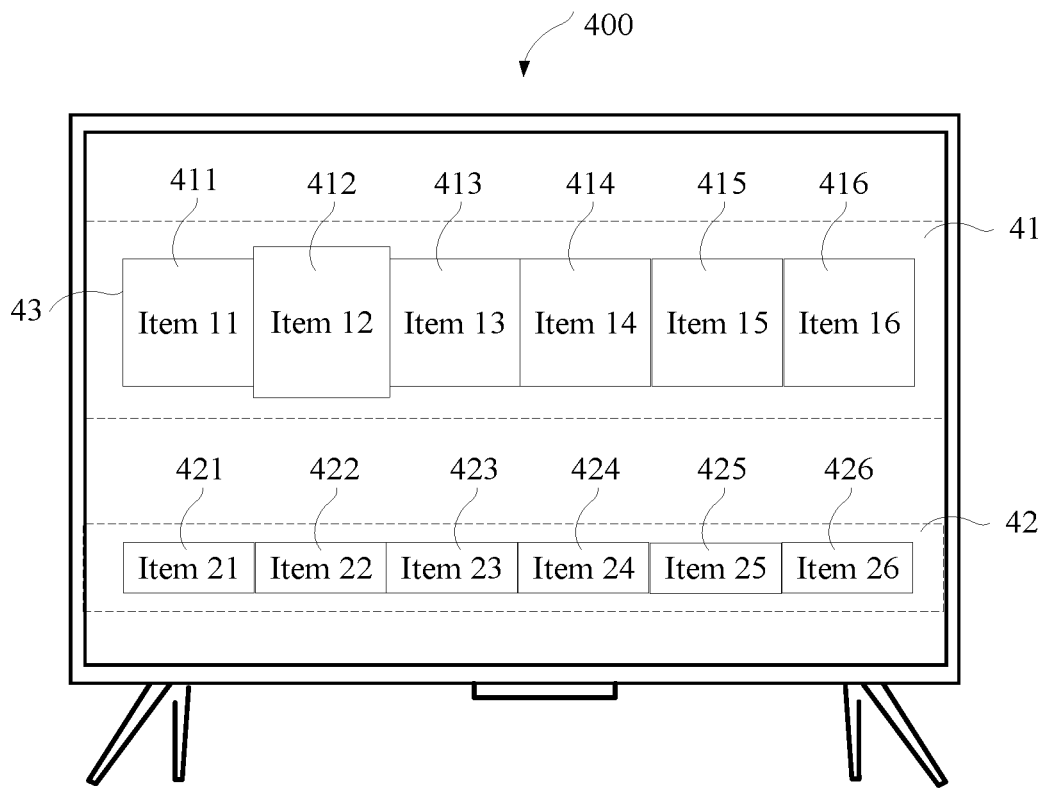

In FIG. 3A, when the user operates the control device to instruct the selector 43 to select the item 411, for example, the user presses a direction key on the control device, as shown in FIG. 3B, the display apparatus indicates to output the voice content corresponding to the item 412 when the selector 43 selects the item 412 in response to the key input instruction. For example, the user presses the key for outputting voice explanation on the control device, and the display apparatus outputs the first explanation speech related to the voice content corresponding to the item 412 in response to the key input instruction.

In some embodiments, when the item 412 is a movie, the user presses the right direction key on the control device to instruct the selector 43 to select the movie, the name of the movie is output in voice form. After the user presses a key for outputting the explanation speech on the control device, the story introduction of the movie will be output in voice form.

In some embodiments, when the item 412 is an application, the user presses the right directional key on the control device to instruct the selector 43 to select the application, the name of application is output in voice form. After the user presses the key for outputting the explanation speech on the control device, the application introduction will continue to be output in voice form. For example, the application B is a video website with massive, high-quality and high-definition online videos, a professional online video playing platform, etc.

In some embodiments, after the first explanation speech related to the voice content corresponding to the item 412 is output, the first explanation speech includes voice information for prompting the existence of a second explanation voice following the first explanation voice, the user presses a key for outputting the explanation speech on the control device again, and the display apparatus outputs the second explanation speech related to the voice content corresponding to the item 412 in response to the key input instruction.

In some embodiments, when the item 412 is an application store, the user presses the right direction key on the control device to instruct the selector 43 to select the application store, the name of the application store is output in voice form. After the user presses a key for outputting explanation speech on the control device, the software introduction of the application store will continue to be output in voice form. For example, the application store is an electronic platform that specially provides free and paid games and application download services for mobile devices such as mobile phones, tablet computers, etc. After the explanation speech, there is also "If you want to learn the specific application in the application store, please press a key for outputting the voice explanation again within 2 s". The user presses the key for outputting the voice explanation on the control device, voice like the name of the downloadable applications in the application store will be output, where the voice content is, for example, application A, application B, application C, etc.

If a visual impaired or blind user wants to know whether there is any application he or she wants to use in the application store, there is no need for the user to click into the application store and traverse and broadcast all applications to find the application he or she wants to use in the present application. In the present application, the explanation speech of the application store can be directly played or output to know whether the application store has the application he or she wants to use, and there is no need for the user to click into the corresponding interface and traverse it to obtain the corresponding information, reducing the unnecessary operations of the user and improving user experience.

Figure 4A:
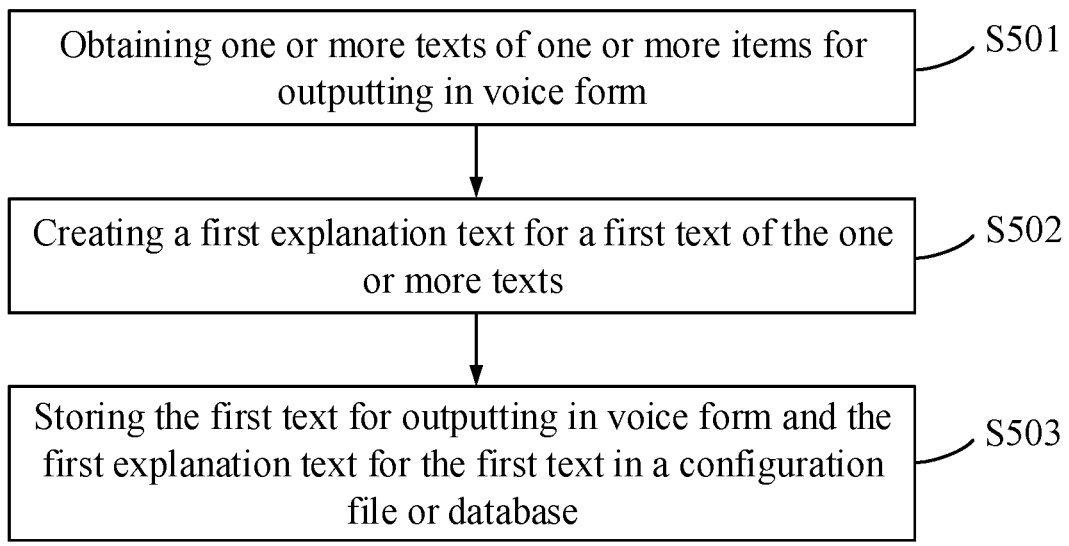
FIGS. 4A-4F show flow charts of a content-based speech output method.

In some embodiments, with reference to the method shown in FIG. 4A, before receiving a first instruction from a user through the control device, the content-based voice output method includes:

step S501: obtaining one or more texts of one or more items for outputting in voice form.

Here, the one or more items can include items with a text or phrase on many user interfaces of the display apparatus. The one or more texts of the one or more items on the user interface for outputting in voice form include but not limited to: the name of an application store, the name of an application, the name of a video (such as movie/TV series), the name of system settings, etc.

Step S502: creating a first explanation text for a first text of the one or more texts.

In order to facilitate the user to further understand the specific content in case a user does not understand the voice corresponding to the text, the disclosure needs to further create an explanation text for the text for outputting in voice form, so that the user can understand the specific content and function of the text, wherein each text for outputting in voice form has at least one corresponding explanation text. The first text is a text among the one or more texts for the one or more items for outputting in voice form on a user interface of the display apparatus. For example, the first text is for a first item among the one or more items. The first explanation text is an explanation text among one or more explanation texts for the first text.

In some embodiments, when the text for outputting in voice form is a name of the application store and a name of the application, the explanation text may be a specific introduction to the functions of the application store and the application, or the names of the applications included in the application store. When the text for outputting in voice form is a video (such as a movie/TV drama), the explanation text may be a brief introduction to the video. When the text for outputting in voice form is a name of system settings, the explanation text may specifically include sound setting, time setting, etc.

Step S503: storing the first text for outputting in voice form and the first explanation text for the first text in a configuration file or database.

In the disclosure, the texts for outputting in voice form for all the items, creating the explanation texts corresponding to the texts for outputting in voice form, and store the texts for outputting in voice form and the explanation texts for said texts into a configuration file or database in one-to-one correspondence. When the output content is not well understood, the explanation of the text can be output through a related operation (such as pressing a button on the remote control), so that the user can understand the content of the voice more clearly via the explanation of the text.

Figure 4B:
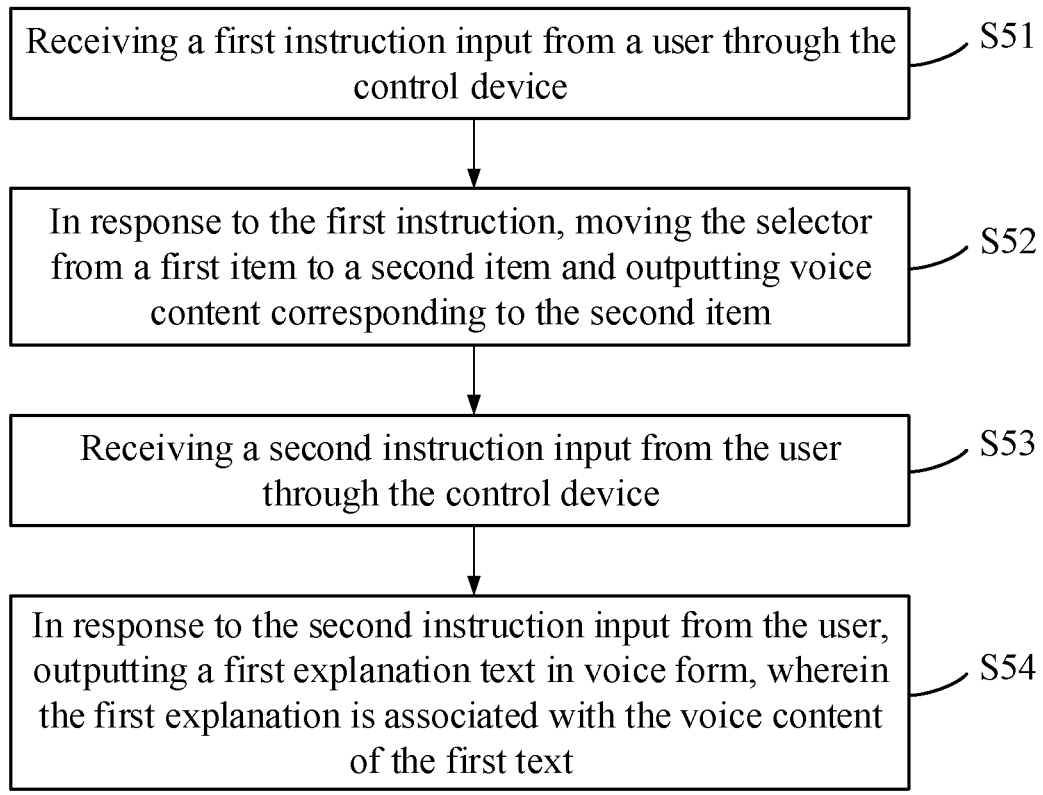

With reference to the method shown in FIG. 4B, a content-based voice output method includes the following steps S51-S54.

Step S51: receiving a first instruction input from a user through the control device.

When the voice guide function of the display apparatus is activated, the position of the selector on the user interface is moved by the control device to select a different item.

Step S52: in response to the first instruction, moving the selector from a first item to a second item and outputting voice content corresponding to the second item.

Figure 4C:
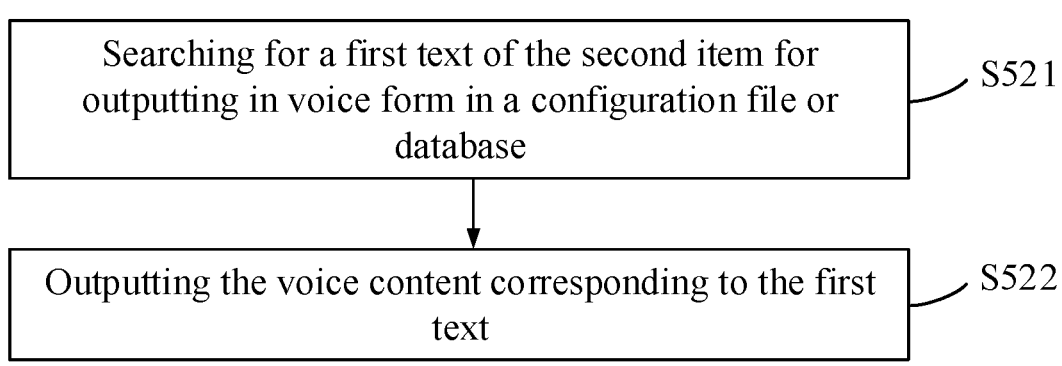

In some embodiments, with reference to the method shown in FIG. 4C, the output of the voice content corresponding to the second item in step S52 specifically includes the following.

Step S521: searching for a first text of the second item for outputting in voice form in a configuration file or database.

Step S522: outputting the voice content corresponding to the first text.

In some embodiments, the second item is a movie, the movie name corresponding to the movie as the text for the second item for output is searched in the configuration file or database, and the voice of the movie name is output.

Step S53: receiving a second instruction input from the user through the control device.

When the user does not understand the content corresponding to the second item during the voice outputting process, the user presses a key (for example, a shortcut key) on the control device without moving the focus, for example, presses a key for outputting a explanation text in voice form, so that the display apparatus outputs the explanation speech for the second item in voice form. In other words, while the selector is landing or holding on the second item, the user presses a key for outputting an explanation text in voice form. The display apparatus receives a key event associated with the key for outputting an explanation text in voice form, and responds to the key event to output explanation text.

Step S54: in response to the second instruction input from the user, outputting a first explanation text in voice form, wherein the first explanation is associated with the voice content of the first text.

Figure 4D:
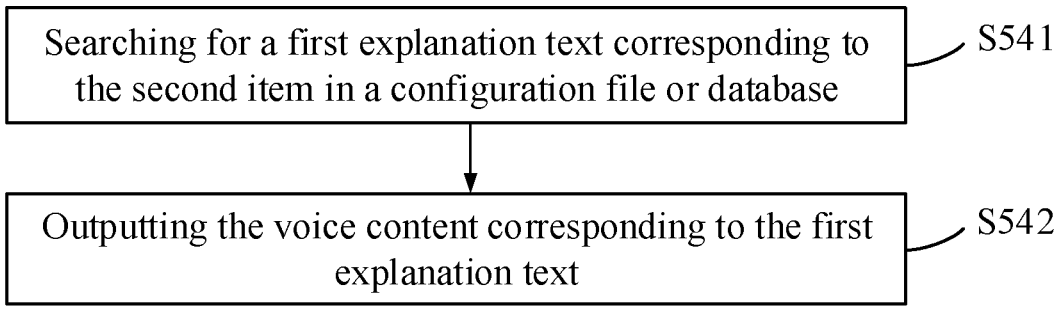

In some embodiments, with reference to the method shown in FIG. 4D, the playing or outputting a first explanation text associated with the voice content in step S54 further includes the following.

Step S541: searching for a first explanation text corresponding to the second item in a configuration file or database.

Step S542: outputting voice content corresponding to the first explanation text.

In some embodiments, when the user does not understand it in a case where only the name of a certain movie (the second item) is output in voice form, the user inputs a second instruction to look for the first explanation text corresponding to the movie in the configuration file or database, where the first explanation text is the brief of the movie; and the brief of the movie is output in voice form.

The content-based voice output method according to the disclosure can directly output the voice of a selected item and its first explanation text to avoid a situation where the user cannot understand the specific meaning of the voice content of an item when he does not understand it, and can directly obtain the content the user wants to know. It is unnecessary for the user to click into the corresponding interface to obtain the corresponding information, reducing the inconvenient operations of the user and improving the user's experience.

Figure 4E:
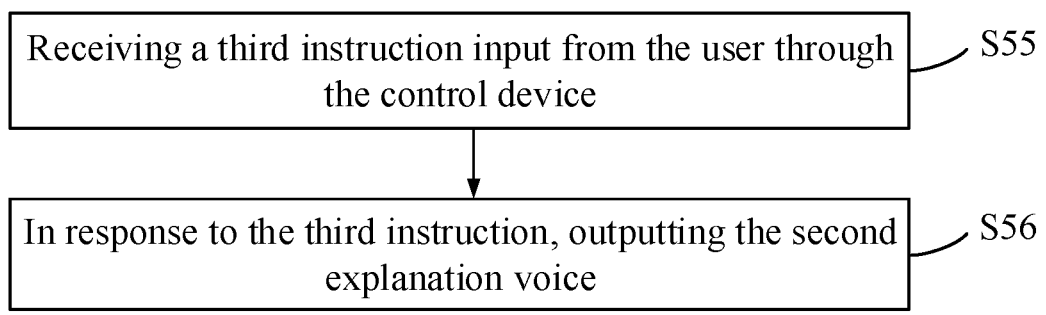

In some embodiments, with reference to the method shown in FIG. 4E, the first explanation voice includes voice information for indicating or prompting existence of a second explanation text for outputting in voice form and associated with the first text, wherein the second explanation text is configured for describing further or additional information about the first text.

It should be noted that each text for outputting in voice form corresponds to at least one explanation text, that is, a focus output voice corresponds to at least one explanation text for outputting in voice form. When there are two or more kinds of explanation texts, a previous explanation text output in voice form is configured with content for indicating a next explanation text available for outputting in voice form following the previous explanation text, and may further provide an alert on how to operate to get the next explanation text output in voice form for the user. For example, "if you want to hear a second voice explanation of the selected item, please press the key for outputting the voice explanation again within the preset time" may further included at the end of the first voice explanation. If the previous explanation voice does not include an alert for indicating there is a second explanation voice following the previous explanation voice, it means that the selected item has only one explanation voice or only one explanation text for outputting in voice form.

Step S55: receiving a third instruction input from the user through the control device.

When the user knows that there is a second explanation speech as well and wants to continue learning more content of the selected item, he or she may further input the third instruction. Specifically, the user presses a key (such as a key for outputting an explanation voice) on the control device without moving the focus from the selected item, to play the second explanation voice.

Step S56: in response to the third instruction, outputting the second explanation voice.

Figure 4F:
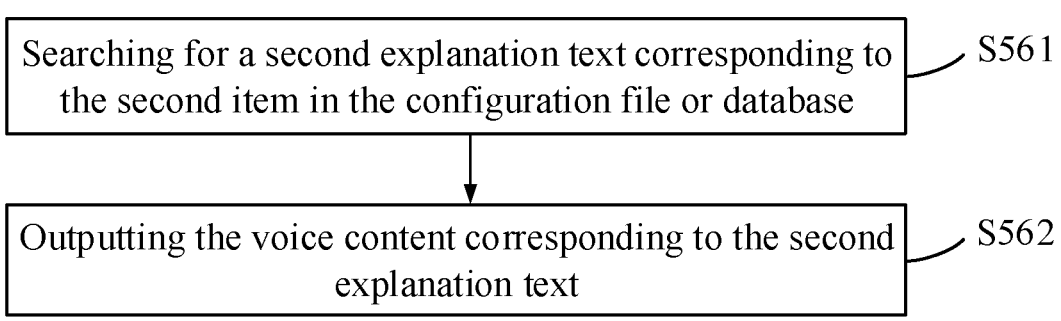

In some embodiments, with reference to the method shown in FIG. 4F, the outputting the second explanation voice related to the voice content in step S56 specifically includes the following.

Step S561: searching for a second explanation text corresponding to the second item in the configuration file or database.

Step S562: outputting the voice content corresponding to the second explanation text.

In some embodiments, when the user still wants to learn more about a certain film after knowing a brief introduction of the certain film, he or she inputs a third instruction, the display apparatus looks for a second explanation text corresponding to the film in the configuration file or database, where the second explanation text is the introduction to the film's director and actors; and the voice of the introduction about the film's director and actors is output.

As described in the above embodiments, the position of the selector on the user interface is moved via the user input to obtain the voice content of the selected item. In a case where the output voice content of the selected item is difficult for the user to understand, the display apparatus may read a specific explanation corresponding to the selected item in response to a command input from the user, so that the user can understand the meaning of the voice content clearly via the voice guide function, allowing for visual impaired people to use the TV more conveniently and friendly, and providing full potential of the voice guide function on the TV. This method is practical and will improve user experience as well.

FIGS. 5A-5D show schematic diagrams of a GUI on the display apparatus 200 by operating the control device 100.

Figure 5A:
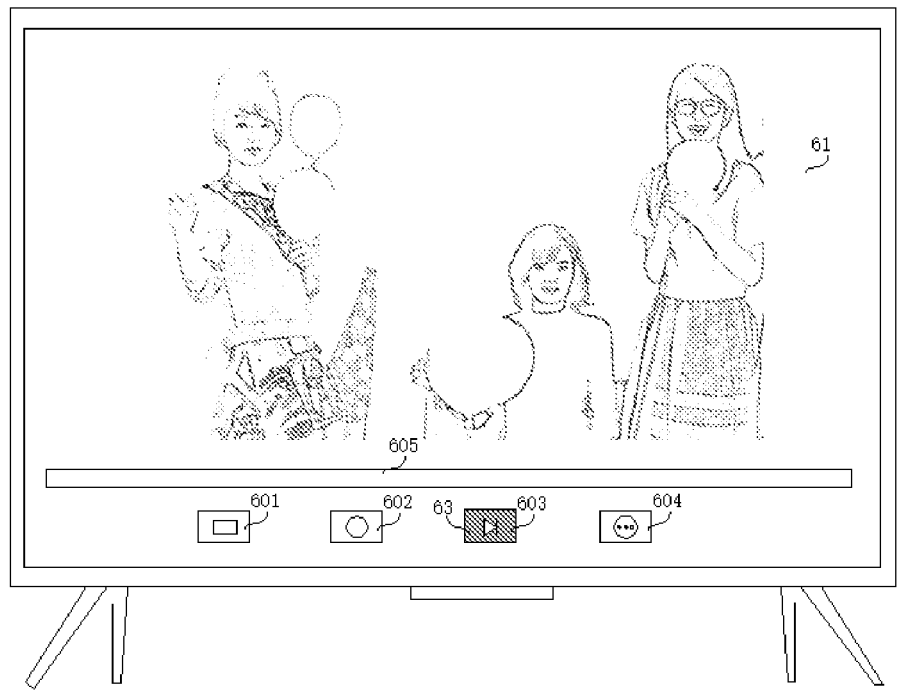
FIGS. 5A-5D show schematic diagrams of a GUI on the display apparatus 200 by operating the control device 100.

For example, when a user can determine that the item 412 is a film video through the above explanation voice configured for the item 412, the display apparatus presents the GUI as shown in FIG. 5A on the display based on a user input for activating the film video. The GUI includes a play screen 61 corresponding to the video content, a plurality of items 601-604, a time progress bar 605 and a selector 63, and the position of the selector in the GUI may be moved by operating the control device from a user as a prompt for the user.

In FIGS. 5A-5D, when the display of the display apparatus shows a play screen such as film video content, and when an instruction is received from a user by operating the control device, the display apparatus may cause the selector land on the time progress bar and output the voice content corresponding to a current play progress indicated by the selector in response to the instruction.

It should be noted that the selector indicates the current play progress of the audio content on the time progress bar when the selector 63 moves to the time progress bar 605, and for example, the current play progress is 00:10:05. Since the current play progress on the time progress bar will be continuously updated, the display apparatus will output or play the voice content corresponding to a current playback progress continuously. Especially when the current play progress on the time progress bar is updated in real time by second, the voice content for indicating a current playback progress will be updated and output frequently by second.

For example, a current play time is 00:26:05. Since it is difficult to complete a voice output for the time 00:26:05 within 1 second and the updated time will be output in voice form after 1 second. In this case, voice output like "twenty six, twenty six, twenty six" once time is updated every second will occur, resulting in poor user experience. Meanwhile, the user wants to be informed of a current play progress. For example, when a user wants to fast-forward and fast-rewind according to the time progress bar, the user needs to learn the current play progress on the time progress bar to continue a next operation.

Figure 5B:
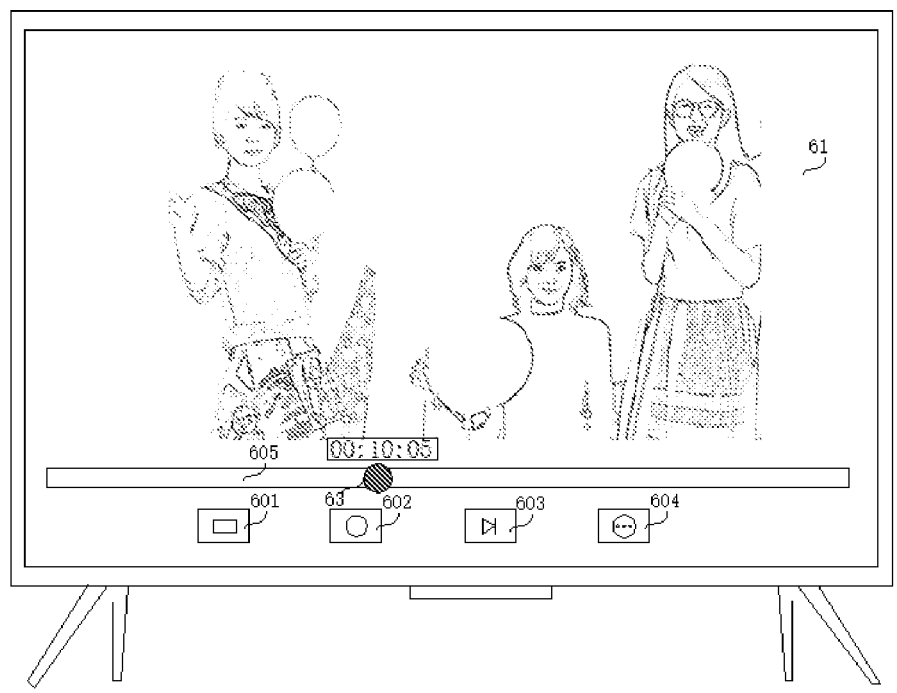

In some embodiments, in FIG. 5A, when the user operates a control device to cause the selector 63 select the item 603, for example, the user presses the up directional key on the control device. As shown in FIG. 5B, in response to the instruction input from the user via the remote control device, the display apparatus is caused to output the voice corresponding to a current play progress (for example, a current play time 00:10:05 on the play progress bar) upon the selector 63 moving from the item 603 to the time progress bar 605.

In a scenario where a current play progress on the time progress bar is updated by second, when a current play progress indicated by the selector is updated to 00:10:06, the voice corresponding to the current play time 00:10:06 may omit, not voice outputting of the play time 00:10:06, therefore such a phenomenon where the voice corresponding to the play time 00:10:06 is output while the voice corresponding to the previous play time 00:10:05 has not been completely output within 1 second will be avoided. Similarly, when a current play progress indicated by the selector is updated to 00:10:07, the voice corresponding to the play time 00:10:07 may not be read out. Here, after the voice corresponding to the play time 00:10:05 is output, whether the voice corresponding to a next play time needs to be output is determined. If a current play time indicated by the selector is updated to 00:10:08, it is determined that a period of time after the voice corresponding to the play time 00:10:05 is output reaches 2 seconds, the voice corresponding to the play time 00:10:08 may be output.

Thus, by enabling the display apparatus to reduce the frequency of voice output corresponding to the current play time on the time progress bar, the frequent voice output can be avoided, and the user experience can be improved.

In some embodiments, in FIG. 5A, when the user operates the control device to indicate that the selector 63 has selected the item 603, for example, the user presses the up directional key on the control device, as shown in FIG. 5B, in response to the instruction associated with the up directional key on the control device, the display apparatus is caused to move the selector 63 from the item 603 to the time progress bar 605 and output the voice corresponding to a current play time (that is, the voice corresponding to a first progress point: 00:10:05).

Figure 5C:
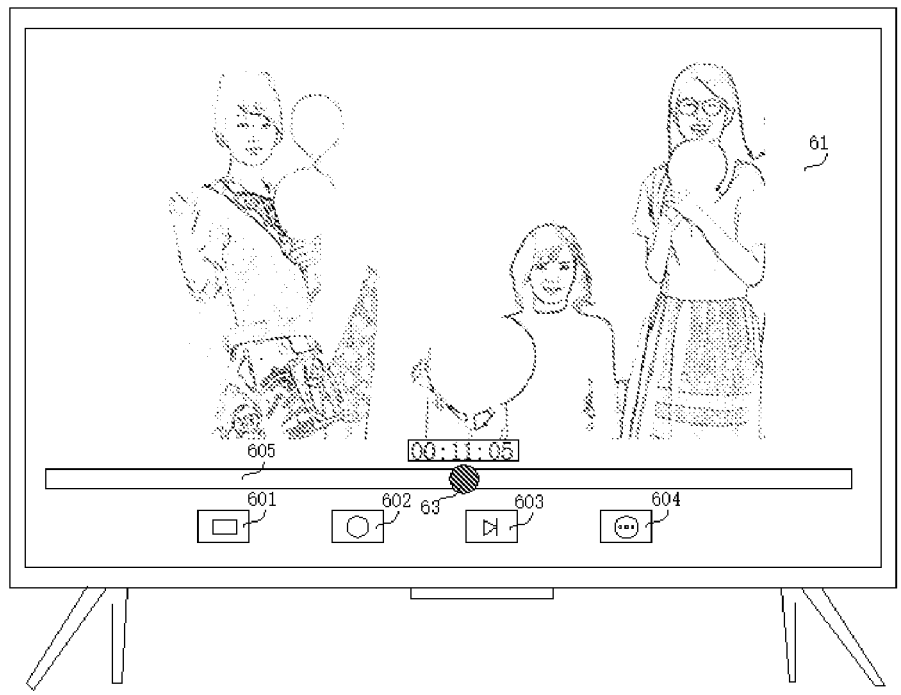

If the right directional key on the control device is pressed by a user in a short period of time, as shown in FIG. 5C, in response to an instruction associated with the right directional key input from the user, the display apparatus moves the position of the selector 63 on the time progress bar 605 to a second progress point. But, the playing of the voice content of the first progress point has not been completed, or the playing of the voice content of the first progress point has been completed but the preset time interval has not reached so the second progress point 00:11:05 on the time progress bar indicated by the selector 63 is not played or output in voice form.

Figure 5D:
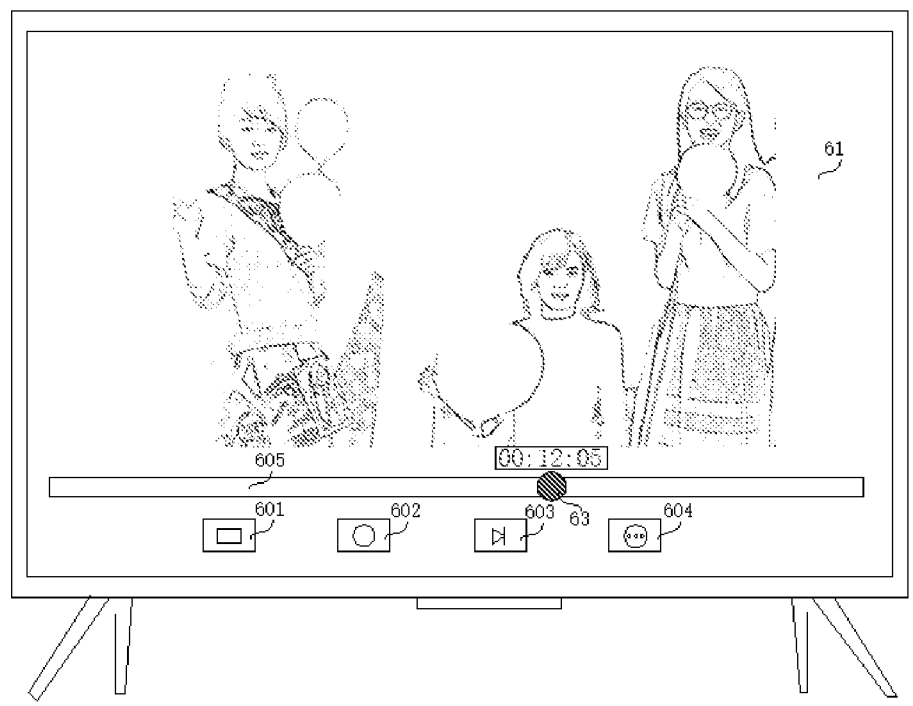

If the right direction key on the control device is pressed again by the user in a short period of time, as shown in FIG. 5D, in response to another instruction associated with the right directional key input from the user, the display apparatus moves the position of the selector 63 on the time progress bar 605 to a third progress point. After the playing of the voice content of the first progress point completes and a preset time interval since the playing of the first progress point has reached, the voice content (that is, 00:12:05) of the third progress point on the time progress bar indicated by the selector is output in voice form.

In the above example, when the user needs to watch the audio content corresponding to 00:12:05, he or she presses the right directional key repeatedly for a short time, so that the selector is moved from the first progress point to the second progress point and the third progress point respectively. When the time interval for the selector to move to the second progress point and the third progress point is less than a preset value, an instruction for outputting the voice of the second progress point is discarded, and the voice (that is, 00:12:05) corresponding to the third progress point is directly output. When the time interval for the selector to move to the second progress point and the third progress point is not less than the preset value, the voice (that is, 00:11:05) corresponding to the second progress point is output.

In this way, when the current playback progress is fast-forwarded or rewinded based on user's input, only the voice corresponding to the latest progress may be output, which can also avoid frequent voice guide output and improve user's experience.

It should be noted that the sound volume of the voice output may be higher than the playing volume of the audio content to remind the user during the voice guide output; and when the voice guide output ends, the playing volume of the audio content before the voice playing may be restored, so that the user continues to watch the audio content.

Figure 6A:
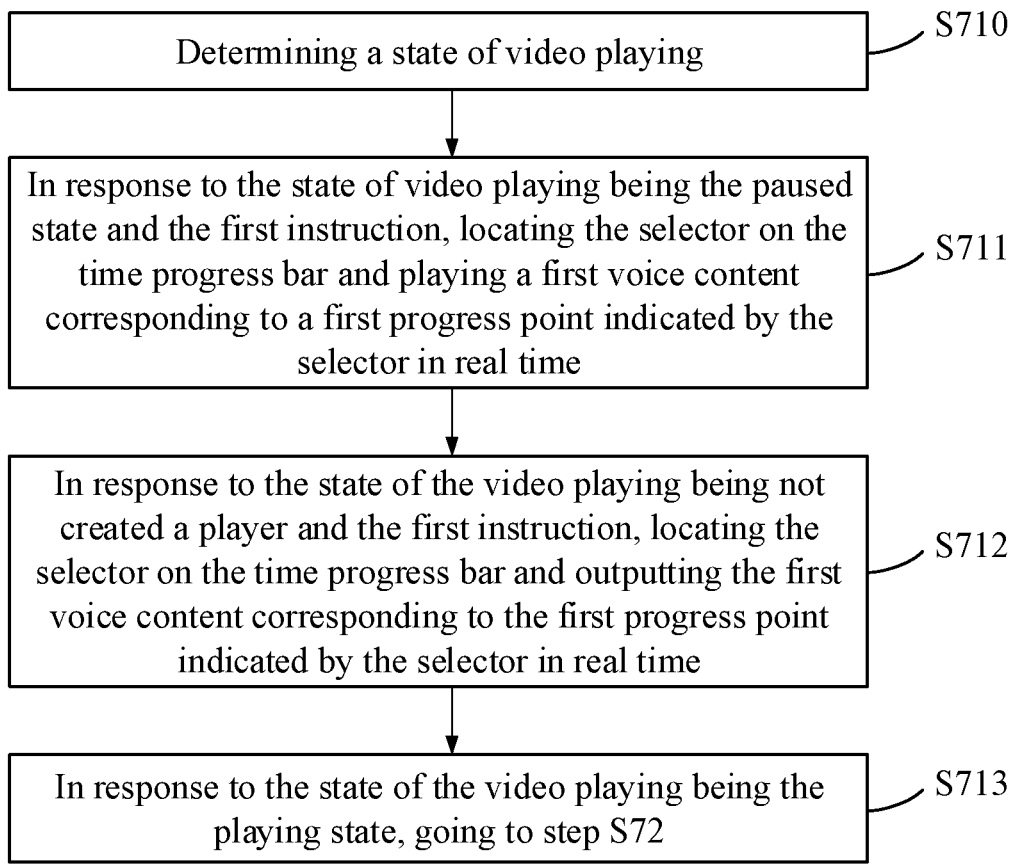
FIGS. 6A-6B show flow charts of another content-based speech output method.
Figure 6B:
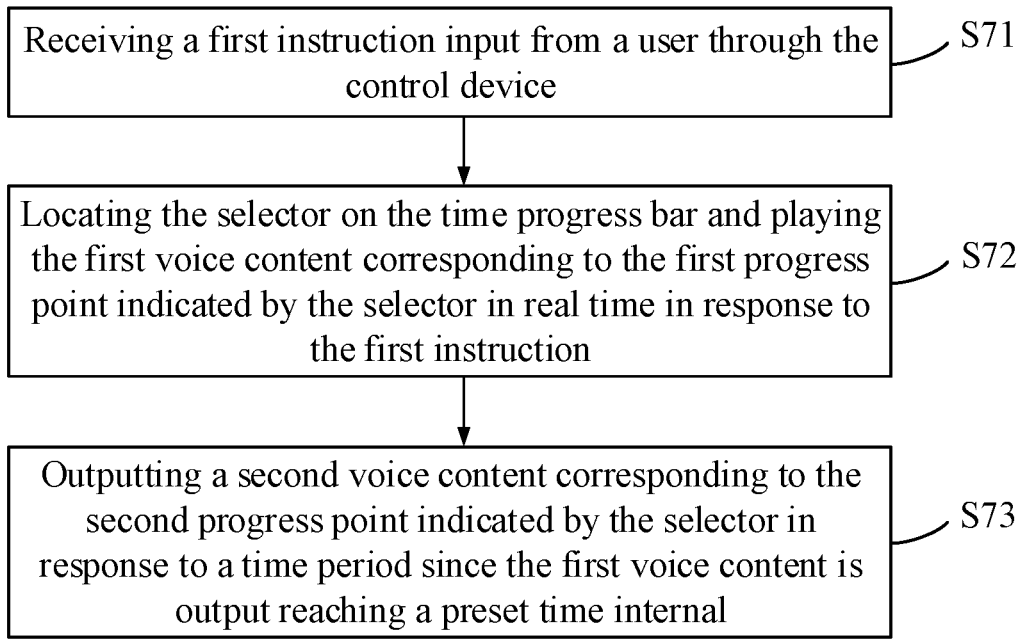

FIGS. 6A-6B show flow charts of another content-based voice output method.

With reference to the method shown in FIG. 6B, the method includes the following steps S71-S73.

Step S71: receiving a first instruction input from a user through the control device. For example, the first instruction input may be from pressing a menu key, a direction key, an OK key, etc. on the control device by the user.

With reference to the method shown in FIG. 6A, after receiving a first instruction input from a user through the control device, the method further includes:

step S710: determining a state of video playing.

Specifically, the process for determining a state of the video playing includes: querying an interface for indicating whether the video is played or not, where the interface provides states: PLAYING, PAUSED and INVALID, wherein the state PLAYING indicates the player of the video is in a current playing state, PAUSED indicates that the player of the video is in the paused state, and INVALID indicates that the player is not created. When starting to determining a state of the video playing, the video playing state in the player is queried. If it is in the playing state, the result of PLAYING will be returned; if it is in the paused state, the result of PAUSED will be returned; if the player is not created, the result of INVALID will be returned.

Step S711: in response to the state of video playing being the paused state and the first instruction, locating the selector on the time progress bar and playing a first voice content corresponding to a first progress point indicated by the selector in real time.

In some embodiments, upon receiving the first instruction, whether a video is currently played is determined; and if the player is in the paused state, the first voice content corresponding to the first progress point indicated by the selector is directly played or output.

When the state of the video playing is the paused state, there is no sound in the video that can affect the voice guide output, so the first voice content corresponding to the first progress point can be directly played.

Step S712: in response to the state of the video playing being not created a player and the first instruction, locating the selector on the time progress bar and outputting the first voice content corresponding to the first progress point indicated by the selector in real time.

In some embodiments, after receiving the first instruction, whether a video is currently played is determined; and if a player for the video playing has not been created, the first voice content corresponding to the first progress point indicated by the selector is directly output.

When the state indicates that the player is not created, there is no sound in the video that can affect the voice guide output, so the first voice content corresponding to the first progress point can be directly output.

Step S713: in response to the state of the video playing being the playing state, the flow goes to step S72.

Step S72: locating the selector on the time progress bar and playing the first voice content corresponding to the first progress point indicated by the selector in real time in response to the first instruction.

Specifically, the first instruction refers to the user pressing the menu key, direction key, OK key, etc. on the control device.

Step S73: outputting a second voice content corresponding to the second progress point indicated by the selector in response to a time period since the first voice content is output reaching a preset time internal.

Specifically, a setting menu is provided for the user to set the output rate, i.e., the preset time interval. The user may set the appropriate output rate as needed.

In some embodiments, the preset time interval set by the user is 2 s. After the first instruction is received, the first voice content corresponding to the first progress point indicated by the selector is output. Whether an interval from the time when a second instruction is issued to the time when the playing of the first voice content is completed is greater than 2 s will be determined; and assuming that the time when the playing of the first voice content is completed is 12:00:00. If the time when the second instruction is received is 12:00:03, the interval from the time when the second instruction is issued to the time when the playing of the first voice content is completed is 3 s, which is greater than 2 s, that is, the interval between the time when the second instruction is issued and the time when the playing of the first voice content is completed is greater than the preset time interval, so the second voice content corresponding to the second progress point indicated by the selector in the second instruction is output.

If the time when the second instruction is received is 12:00:01, the interval from the time when the second instruction is issued to the time when the playing of the first voice content is completed is 1 s, which is less than 2 s, that is, the interval between the time when the second instruction is issued and the time when the playing of the first voice content is completed is less than the preset time interval, so the second voice content corresponding to the second progress point indicated by the selector in the second instruction is not read.

Figure 7:
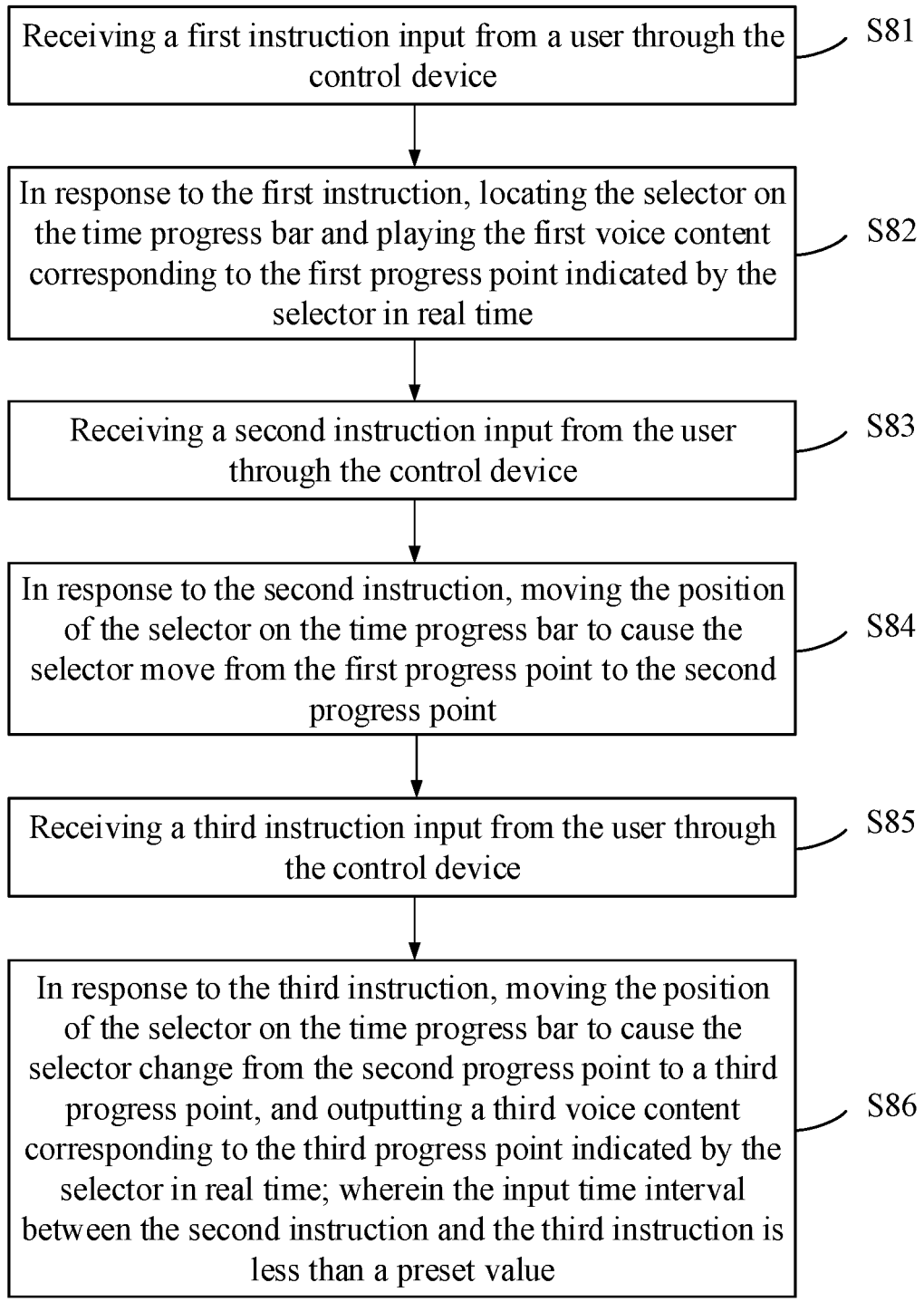
FIG. 7 shows a flow chart of yet another content-based speech output method.

FIG. 7 shows a flow chart of yet another content-based voice output method.

With reference to the method shown in FIG. 7, the method includes the following steps S81-S83.

Step S81: receiving a first instruction input from a user through the control device. For example, the user presses a menu key, a direction key, an OK key, etc. on the control device.

It should be noted that a state of the video playing scenario needs to be determined after receiving the first instruction input from the user, and the specific steps are similar to S710-S712. If the state of the video playing indicates that the player is in the playing state, which means the state of the video playing being the playing state, the flow goes to step S82.

Step S82: in response to the first instruction, locating the selector on the time progress bar and playing the first voice content corresponding to the first progress point indicated by the selector in real time.

Step S83: receiving a second instruction input from the user through the control device. For example, the user presses a menu key, a direction key, an OK key, etc. on the control device.

Step S84: in response to the second instruction, moving the position of the selector on the time progress bar to cause the selector move from the first progress point to the second progress point.

Step S85: receiving a third instruction input from the user through the control device. For example, the user presses a menu key, a direction key, an OK key, etc. on the control device.

Step S86: in response to the third instruction, moving the position of the selector on the time progress bar to cause the selector change from the second progress point to a third progress point, and outputting a third voice content corresponding to the third progress point indicated by the selector in real time; wherein the input time interval between the second instruction and the third instruction is less than a preset value.

Specifically, a setting menu is provided for the user to set the preset value. The user may set the appropriate preset value as needed.

In some embodiments, the preset value set by the user is 1.5 s. After the first instruction is received, the first voice content corresponding to the first progress point (00:10:05) indicated by the selector is output. The second instruction input from the user through the control device is received, and the position of the selector on the time progress bar is moved, so that the selector changes from the first progress point (00:10:05) to the second progress point (00:11:05). Assuming the input time of the second instruction is 12:00:00. The third instruction input from the user through the control device is received, and the position of the selector on the time progress bar is moved to cause the selector change from the second progress point (00:11:05) to the third progress point (00:12:05). If the time when the third instruction is received is 12:00:01, the input time interval between the second instruction and the third instruction is 1 s, which is less than 1.5 s, that is, the input time interval between the second instruction and the third instruction is less than the preset value, and the third voice content corresponding to the third progress point indicated by the selector is directly played.

As described in the above embodiments, the user interface for playing the audio and video content is displayed on the display apparatus, and the position of the selector in the user interface is moved through the user input. When responding to the command input from the user, a next voice can only be output when a period of time reaches after a previous voice has been output, thereby reducing the frequent voice output of timestamps, subtitles, etc. that interfere with the normal audio and video sounds effectively, and improving user experience.

The above embodiments are provided for purpose of illustration and description, and are not intended to limit the disclosure. Individual elements or features in a specific embodiment are generally not limited to this specific embodiment, but, where applicable, may be used or interchanged in other embodiments even if not specifically shown or described. Likewise, many variations are possible, these variations are not to be considered as departing from the scope of the appended claims of the disclosure, and all such modifications shall fall within the scope of the appended claims of the disclosure.

What is claimed is:

1. A display apparatus, comprising:

a display configured to present a user interface comprising at least one item, wherein the user interface further comprises a selector for indicating that an item on the user interface is selected, and the selector on the user interface is configured to move to select different items based on a user input;

a user input interface configured to receive an instruction from a user;

a controller configured to:

in response to a first instruction via the user input interface from the user, locate the selector on a time progress bar of a video on the user interface and output a first voice content corresponding to a first progress point indicated by the selector on the time progress bar in real time;

after outputting the first voice content corresponding to the first progress point, determine whether a voice content corresponding to a next progress point needs to be output, wherein the controller is further configured to:

in response to a second instruction, via the user input interface from the user corresponding to a second progress point on the time progress bar, determine to output a second voice content corresponding to the second progress point indicated by the selector on the time progress bar based on determination that playing of the first voice content corresponding to the first progress point has been completed, and in response to a third instruction, via the user input interface from the user corresponding to a third progress point on the time progress bar, determine not to output a third voice content corresponding to the third progress point indicated by the selector on the time progress bar based on determination that either the playing of the first voice content corresponding to the first progress point has not been completed or a preset time interval since the playing of the first voice content has not reached, wherein the third progress point is between the first progress point and the second progress point on the time progress bar and the preset time interval is set by the user.

2. The display apparatus according to claim 1, wherein play time on the time progress bar is updated in real time, and the selector on the time progress bar is configured to move with a current play time on the time progress bar.

3. The display apparatus according to claim 1, wherein the controller is further configured to:

upon receiving the first instruction, determine a state of the video, wherein the state of the video playing comprises playing and paused;

in response to the state of the video playing being the paused state and the first instruction, output the first voice content corresponding to the first progress point indicated by the selector on the time progress bar directly without adjusting sound volume of the video; and in response to the state of the video playing being the playing state and the first instruction, output the first voice content corresponding to the first progress point indicated by the selector on the time progress bar with a volume higher than a volume of the video.

4. The display apparatus according to claim 3, wherein the controller is configured to:
   after outputting the first voice content with the volume higher than the volume of the video, restore the volume of the video to a volume of the video before outputting the first voice content.

5. The display apparatus according to claim 1, wherein the controller is further configured to:
   before receiving the first instruction, receive a fourth instruction for moving the selector to a video application icon via the user input user interface from the user by operating a first key on a remote control of the display apparatus; and
   in response to the fourth instruction, move the selector to the video application icon and output a fifth voice content corresponding to the video application, wherein the fifth voice content comprises a name of the video application.

6. The display apparatus according to claim 5, wherein the fifth voice content further comprises an alert voice for indicating existence of a first explanation voice for the video application following the fifth voice content.

7. The display apparatus according to claim 6, wherein the controller is further configured to:
   while the selector is holding on the video application icon, receive a fifth instruction via the user input interface by operating a second key on the remote control; and
   in response to the fifth instruction, output the first explanation voice for the video application without activating the video application icon, wherein the first explanation voice comprises content or controls in a user interface after activating the video application icon.

8. The display apparatus according to claim 7, wherein the first explanation voice comprises another alert voice for indicating a second explanation voice for the video application following the first explanation voice.

9. The display apparatus according to claim 8, wherein the controller is further configured to:
   while the selector is holding on the video application icon, receive a sixth instruction via the user input interface by operating the second key on the remote control; and
   in response to the sixth instruction, output the second explanation voice for the video application without activating the video application icon, wherein the second explanation voice comprises content different from the first explanation voice.

10. A content-based voice output method, comprising:
    in response to a first instruction via a user input interface of a display from a user, locating a selector on a time progress bar of a video on a user interface of the display and outputting a first voice content corresponding to a first progress point indicated by the selector on the time progress bar in real time; wherein the user interface comprises at least one item, and the selector is configured to indicate that an item on the user interface is selected and move to select different items based on user inputs;
    after outputting the first voice content corresponding to the first progress point, determining whether a voice content corresponding to a next progress point needs to be output, by performing:
        in response to a second instruction, via the user input interface from the user corresponding to a second progress point on the time progress bar, determine to output a second voice content corresponding to the second progress point indicated by the selector on the time progress bar based on determination that playing of the first voice content corresponding to the first progress point has been completed, and
        in response to a third instruction, via the user input interface from the user corresponding to a third progress point on the time progress bar, determine not to output a third voice content corresponding to the third progress point indicated by the selector on the time progress bar based on determination that either the playing of the first voice content corresponding to the first progress point has not been completed or a preset time interval since the playing of the first voice content has not reached,
    wherein the third progress point is between the first progress point and the second progress point on the time progress bar and the preset time interval is set by the user.

11. The content-based voice output method according to claim 10, wherein play time on the time progress bar is updated in real time, and the selector on the time progress bar is configured to move with a current play time on the time progress bar.

12. The content-based voice output method according to claim 10, further comprising:
    upon receiving the first instruction, determining a state of the video, wherein the state of the video playing comprises playing and paused;
    in response to the state of the video playing being the paused state and the first instruction, outputting the first voice content corresponding to the first progress point indicated by the selector on the time progress bar directly without adjusting sound volume of the video; and
    in response to the state of the video playing being the playing state and the first instruction, outputting the first voice content corresponding to the first progress point indicated by the selector on the time progress bar with a volume higher than a volume of the video.

13. The content-based voice output method according to claim 12, further comprising:
    after outputting the first voice content with the volume higher than the volume of the video, restoring the volume of the video to a volume of the video before outputting the first voice content.

14. The content-based voice output method according to claim 10, further comprising:
    before receiving the first instruction, receiving a fourth instruction for moving the selector to a video application icon via the user input user interface from the user by operating a first key on a remote control of the display apparatus; and
    in response to the fourth instruction, moving the selector to the video application icon and output a fifth voice content corresponding to the video application, wherein the fifth voice content comprises a name of the video application.

15. The content-based voice output method according to claim 14, wherein the fifth voice content further comprises an alert voice for indicating existence of a first explanation voice for the video application following the fifth voice content.

16. The content-based voice output method according to claim 15, further comprising:
    while the selector is holding on the video application icon, receiving a fifth instruction via the user input interface by operating a second key on the remote control; and
    in response to the fifth instruction, outputting the first explanation voice for the video application without activating the video application icon, wherein the first explanation voice comprises content or controls in a user interface after activating the video application icon.

17. The content-based voice output method according to claim 16, wherein the first explanation voice comprises another alert voice for indicating a second explanation voice for the video application following the first explanation voice.

18. The content-based voice output method according to claim 17, further comprising:
   while the selector is holding on the video application icon, receiving a sixth instruction via the user input interface by operating the second key on the remote control; and
   in response to the sixth instruction, outputting the second explanation voice for the video application without activating the video application icon, wherein the second explanation voice comprises content different from the first explanation voice.

\* \* \* \* \*